US008262165B2

(12) United States Patent
Mitsuhashi

(10) Patent No.: US 8,262,165 B2
(45) Date of Patent: Sep. 11, 2012

(54) CONNECTION DEVICES

(75) Inventor: Atsutaka Mitsuhashi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 395 days.

(21) Appl. No.: 12/598,677

(22) PCT Filed: Apr. 22, 2008

(86) PCT No.: PCT/JP2008/057742
§ 371 (c)(1),
(2), (4) Date: Nov. 3, 2009

(87) PCT Pub. No.: WO2008/139851
PCT Pub. Date: Nov. 20, 2008

(65) Prior Publication Data
US 2010/0117429 A1     May 13, 2010

(30) Foreign Application Priority Data
May 8, 2007   (JP) ................................ 2007-123289

(51) Int. Cl.
*B60N 2/42*   (2006.01)
(52) U.S. Cl. .................................... 297/362; 297/367 R
(58) Field of Classification Search .................. 297/362, 297/367 R, 373, 374, 362.12
See application file for complete search history.

(56) References Cited

U.S. PATENT DOCUMENTS

| 6,520,583 | B1 | 2/2003 | Bonk | |
| 7,384,101 | B2 | 6/2008 | Kawashima et al. | |
| 7,644,989 | B2* | 1/2010 | Baloche Faurecia | 297/362 |
| 7,695,068 | B2* | 4/2010 | Maeda et al. | 297/362.11 |
| 2002/0185903 | A1* | 12/2002 | Hosokawa | 297/362 |
| 2005/0248196 | A1* | 11/2005 | Sakai et al. | 297/362 |
| 2006/0158012 | A1* | 7/2006 | Kawashima | 297/362 |
| 2006/0158013 | A1 | 7/2006 | Kawashima et al. | |
| 2006/0158014 | A1* | 7/2006 | Kawashima | 297/362 |
| 2007/0234536 | A1 | 10/2007 | Frauchiger | |
| 2009/0250989 | A1 | 10/2009 | Endo et al. | |
| 2009/0250990 | A1 | 10/2009 | Endo et al. | |
| 2009/0289488 | A1* | 11/2009 | Mitsuhashi | 297/354.12 |
| 2010/0013287 | A1* | 1/2010 | Mitsuhashi | 297/362 |
| 2010/0013288 | A1* | 1/2010 | Mitsuhashi | 297/362 |
| 2010/0026072 | A1* | 2/2010 | Uramichi et al. | 297/367 R |
| 2010/0180705 | A1* | 7/2010 | Mitsuhashi | 74/413 |
| 2011/0193391 | A1* | 8/2011 | Mitsuhashi | 297/354.1 |
| 2011/0277574 | A1* | 11/2011 | Mitsuhashi et al. | 74/411.5 |

FOREIGN PATENT DOCUMENTS

EP      517332 A1 * 12/1992

(Continued)

OTHER PUBLICATIONS

English language Abstract of JP 2006-14942, Jan. 19, 2006.

*Primary Examiner* — David Dunn
*Assistant Examiner* — David E Allred
(74) *Attorney, Agent, or Firm* — Greenblum & Bernstein, P.L.C.

(57) ABSTRACT

A reclining device as a connecting device includes an internal gear member, an external gear member and a retainer member. The retainer member is constructed such that when retainer strips are axially inserted into depressed portions formed in an outer circumferential portion of the external gear member and then insertion distal ends of the support strips are radially inwardly bent to form contact surface portions, the contact surface portions can be axially held against the outer circumferential portion of the external gear member. The external gear member has dowels that are capable of being fitted to a cushion frame, and the dowels are formed circumferentially in locations positioned between the depressed portions (the locations in which projected portions are formed), so as to be axially projected.

5 Claims, 11 Drawing Sheets

FOREIGN PATENT DOCUMENTS

| | | | |
|---|---|---|---|
| EP | 556712 A2 * | 8/1993 | |
| EP | 1676742 | 7/2006 | |
| EP | 1837229 | 9/2007 | |
| EP | 2068040 A1 * | 6/2009 | |
| EP | 2153751 A1 * | 2/2010 | |
| JP | 3-50526 | 8/1991 | |
| JP | 2006-014942 | 1/2006 | |
| JP | 2006-14942 | 1/2006 | |
| WO | WO 2009019908 A1 * | 2/2009 | |

* cited by examiner

CONNECTION DEVICES

TECHNICAL FIELD

The present invention relates to connection devices. More particularly, the present invention relates to connection devices for relatively rotatably connecting two subject components.

BACKGROUND ART

In a vehicle seat that is conventionally known, a seat back is rotatably connected to a seat cushion via a reclining device, so that a tilt angle of the seat back can be adjusted. Such a reclining device is taught by Japanese Laid-Open Patent Publication Number 2006-14942. The reclining device described therein includes a disk-shaped ratchet affixed to a frame portion of the seat back and a disk-shaped guide affixed to a frame portion of the seat cushion. The ratchet and the guide are axially assembled while being mutually supported, so as to rotate relative to each other.

Also, the ratchet and the guide are circumferentially connected by a cylindrical retainer member along outer circumferential portions thereof, so as to not be axially disengaged from each other. The retainer member has a flange-shaped retainer portion. The retainer portion is formed in one end periphery of the cylindrical retainer member and is shaped to be capable of being axially held against an outer disk surface of the latchet. Therefore, the ratchet and the guide can be axially positioned in the cylindrical retainer member by the retainer portion in order to be incorporated thereinto.

The ratchet and the guide are disposed in the retainer member. Thereafter, the other end periphery of the retainer member is bent and crimped. As a result, the bent end periphery of the retainer member is axially held against an inner disk surface of the guide, so that the ratchet and the guide can be axially clamped. In this disclosure, the guide has radially depressed recesses that are formed in the outer circumferential portion thereof at intervals. Conversely, the retainer member has retainer strips formed therein. The retainer strips are axially inserted into the recesses, so that the outer circumferential portion of the guide can be guided by the retainer strips.

That is, a cylindrical portion of the retainer member is constructed of a plurality of retainer strips that are circumferentially formed therein at intervals. Further, the retainer strips are inserted into the recesses of the guide, so as to guide the same. Therefore, the retainer member can be prevented from being excessively radially projected from the outer circumferential portion of the guide.

According to the conventional art described above, the reclining device can be radially downsized. However, the bent end periphery of the retainer member can be radially inwardly extended along the guide while being positioned closely adjacent to each other. Therefore, projected dowels that are used to attach the guide to the frame portion of the seat back cannot substantially be formed in positions closer to an outer circumferential periphery of the guide.

Thus, there is a need in the art to ensure a connection strength between a connection device and subject components even when the connection device is downsized.

SUMMARY OF THE INVENTION

A connecting device of the present invention is a connecting device that is capable of relatively rotatably connecting two subject components. The connecting device includes two connecting elements and a retainer member. The two connecting elements are respectively integrally connected to one or the other of the two subject components and are coupled to each other so as to be rotatable relative to each other. The retainer member is capable of preventing the two connecting elements from being axially separated from each other. The two connecting elements are capable of being switched between a relatively rotatable condition and a relatively unrotatable condition depending on an operational condition of a rotation prevention mechanism disposed therebetween. The retainer member has a plurality of axially extending retainer strips that are capable of axially crossing over and confining outer circumferential portions of the connecting elements. One of the connecting elements has radially inwardly depressed portions that are respectively formed circumferentially in plural locations on the outer circumferential portion thereof. The retainer member is constructed such that when the retainer strips are axially inserted into the depressed portions formed in the outer circumferential portion of one of the connecting elements and then insertion distal ends of the support strips are radially inwardly bent to form contact surface portions, the contact surface portions can be axially held against the outer circumferential portion of one of the connecting elements. One of the connecting elements has fitting portions that are capable of being fitted to one of the subject components, and the fitting portions are formed circumferentially in locations positioned between the depressed portions, so as to be axially projected.

According to the structure of the present invention, the axially extending retainer strips of the retainer member are axially inserted into the depressed portions formed in the outer circumferential portion of one of the connecting elements and then are bent, so that the bent formed contact surface portions thereof can be axially held against one of the connecting elements. As a result, the retainer member can prevent one of the connecting elements from being disengaged. Thus, because the retainer member can be attached to one of the connecting elements without radially projecting from the outer circumferential portion of one of the connecting elements, the connecting device can be downsized. Further, because the axially projected fitting portions formed in one of the connecting elements are formed circumferentially in the locations positioned between the depressed portions, the fitting portions cannot interfere with the above-described bent ends (the contact surface portions) of the retainer member. As a result, the fitting portions can be positioned closer to an outer circumferential periphery of one of the connecting elements. Therefore, even when the connecting device is downsized, a connection strength between one of the connecting elements and one of the subject components can be ensured.

The present invention can be constructed as follows. That is, one of the connecting elements is formed to have a diameter greater than the diameter of the other of the connecting elements and has an outwardly-faced toothed surface that is capable of meshing with an inwardly-faced toothed surface that is formed in the other of the connecting elements. The projected fitting portions formed in one of the connecting elements are formed in radially outside positions of the outwardly-faced toothed surface.

According to the structure of the present invention, because the fitting portions are positioned outside of the outwardly-faced toothed surface formed in one of the connecting elements, the fitting portions are positioned closer to the outer circumferential periphery. Therefore, the connection strength between one of the connecting elements and one of the subject components via the fitting portions can be increased.

The present invention can be constructed as follows. That is, the projected fitting portions formed in one of the connecting elements are shaped to be extended in a circumferential direction.

According to the structure of the present invention, because the projected fitting portions formed in one of the connecting elements are shaped to be extended in the circumferential direction, the fitting portions have increased shear strength in the circumferential direction. Further, the fitting portions and one of the subject components can be fitted to each other in a large area. As a result, the connection strength between one of the connecting elements and one of the subject components can be increased.

The present invention can be constructed as follows. That is, one of the connecting elements has an axially projected external gear wheel having outwardly-faced teeth that are formed in an outer circumferential surface thereof. The other of the connecting elements has an internal gear wheel having inwardly-faced teeth that are formed in an inner circumferential surface thereof and are capable of meshing with the outwardly-faced teeth of the external gear wheel. Further, a pusher member is disposed between the connecting elements. The pusher member functions to press the external gear wheel to the internal gear wheel so as to mesh with each other. Upon circumferential rotation of the pusher member, the external gear wheel is rotationally pressed so as to rotate relative to the internal gear wheel while changing a meshing position therebetween.

According to the structure of the present invention, the connecting device is implemented as a device in which the external gear wheel formed in one of the connecting elements meshes with the internal gear wheel formed in the other of the connecting elements and in which both of the gear wheels can rotate relative to each other while changing the meshing position therebetween.

The present invention can be constructed as follows. That is, the connecting device is constructed as a reclining device that is capable of rotatably connecting a seat back of a vehicle seat to a fixed body such as a seat cushion such that a tilting angle of the seat back can be adjusted.

According to the structure of the present invention, the connecting device is constructed as the reclining device that is capable of connecting the seat back to the fixed body such as the seat cushion such that the tilting angle of the seat back can be adjusted. Therefore, the reclining device can be compactly arranged with the increased connecting strength.

BEST MODE FOR CARRYING OUT THE INVENTION

Figure 1:
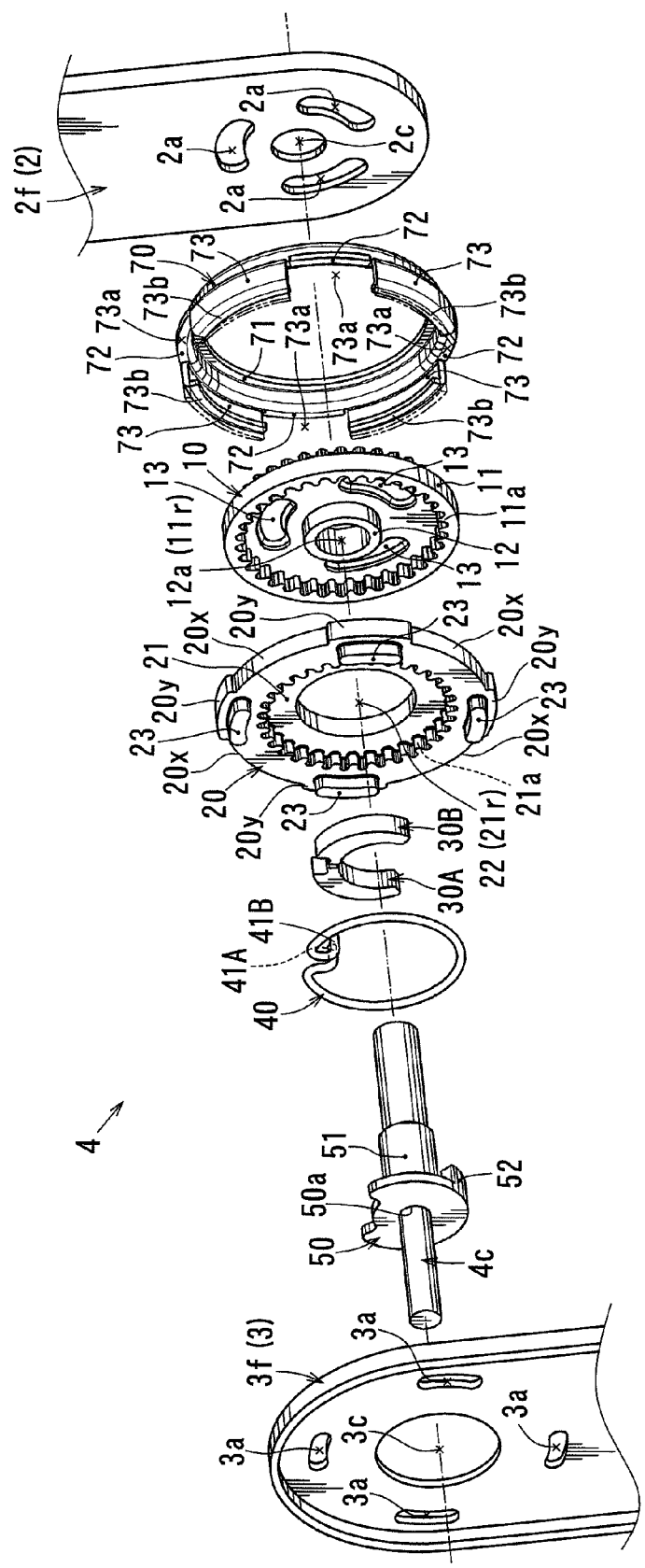
FIG. 1 is an exploded perspective view of a reclining device according to Embodiment 1.

In the following, best modes for carrying out the present invention will be described with reference to the drawings.

Embodiment 1

First, connecting devices of Embodiment 1 will be described with reference to FIGS. 1 to 8. FIG. 3 schematically shows a structure of a vehicle seat 1 having reclining devices 4 and 4 that correspond to connecting devices of the present invention. In the vehicle seat 1, a seat back 2 is connected to a seat cushion 3 via a pair of reclining devices 4 and 4 that are disposed on both side lower portions of the seat back 2.

Each of the reclining devices 4 and 4 is normally maintained in a condition in which a tilting angle of the seat back 2 is fixed. However, each of the reclining devices 4 and 4 is constructed to adjust the tilting angle of the seat back 2 when operating shafts 4c and 4c inserted thereinto are rotated. The operating shafts 4c and 4c are integrally connected to each other via a connection rod 4r, so as to be synchronously rotated when an electric motor (not shown) connected to one of the operating shafts 4c and 4c is actuated.

Further, the electric motor (not shown) is constructed to be turned on and off and to be switched between normal and reverse rotational modes by operating a switch that is attached to, for example, a side portion of the vehicle seat 1. When the reclining devices 4 and 4 are positioned in conditions in which the operating shafts 4c and 4c are not rotated, the reclining devices 4 and 4 are maintained in conditions in which the tilting angle of the seat back 2 is fixed to a desired angle. To the contrary, when the operating shafts 4c and 4c are rotationally moved by actuation of the electric motor, the reclining devices 4 and 4 are switched in conjunction with the motion, so as to change the tilting angle of the seat back 2.

Next, structures of the reclining devices 4 and 4 will now be described. As will be appreciated, the reclining devices 4 and 4 respectively have the substantially same construction as each other with the exception of one aspect that they are symmetrically formed. Therefore, the reclining device 4 that is disposed on the right side in FIG. 3 will be described hereinafter.

Figure 2:
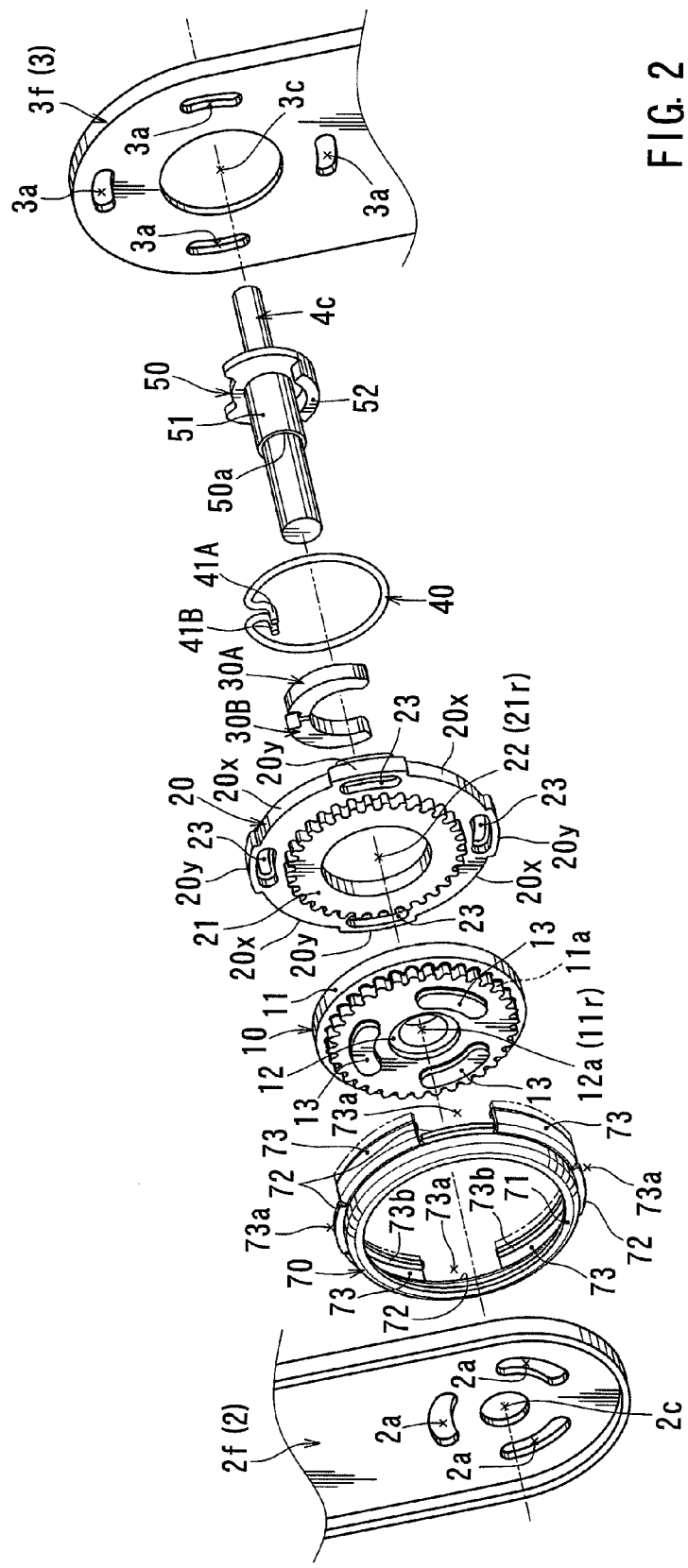
FIG. 2 is an exploded perspective view of the reclining device, which is viewed from a direction opposite to the direction in FIG. 1.
Figure 3:
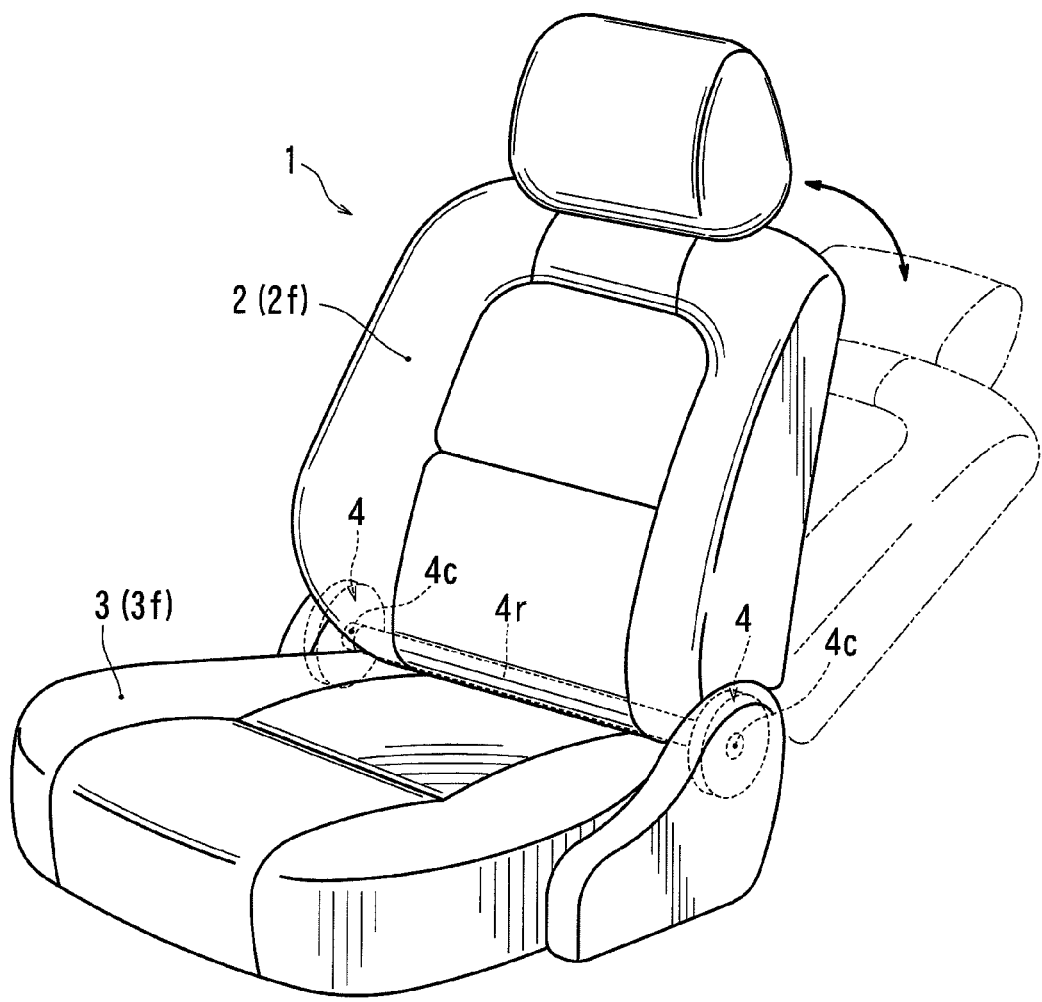
FIG. 3 is an external view of a vehicle seat.
Figure 4:
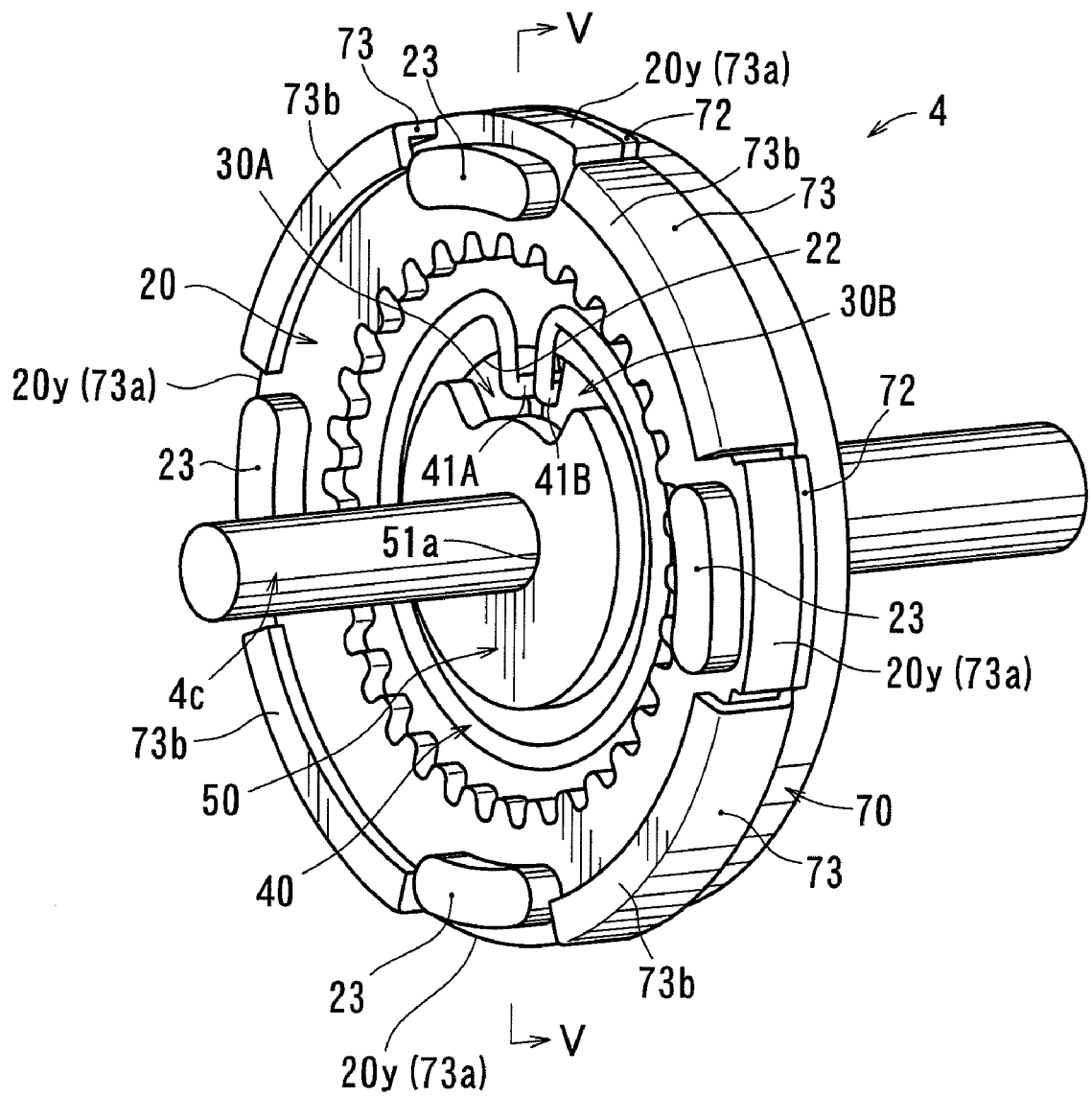
FIG. 4 is a perspective view of the reclining device, which illustrates an assembled condition.

As shown in FIGS. 1 and 2, the reclining device 4 includes a disk-shaped internal gear member 10, a disk-shaped external gear member 20, a pair of piece-shaped pusher members 30A and 30B, an open ring-shaped spring member 40, a cylindrical operating member 50, a rod-like operating shaft 4c, and a thin cylindrical retainer member 70, which are assembled as a unit. Further, these components are axially set in order after the internal gear member 10 is first introduced into the retainer member 70, so as to be assembled as a unit (FIG. 4).

Further, the external gear member 20 corresponds to one of connecting elements of the present invention. Conversely, the internal gear member 10 corresponds to the other of the connecting elements of the present invention. Structures of the components described above will be described in detail with reference to FIGS. 1 and 2 hereinafter.

First, a structure of the internal gear member 10 will be described. The disk-shaped internal gear member 10 is shaped by half die cutting the same in a thickness direction (an axial direction), so that an outer circumferential peripheral portion thereof can be cylindrically projected. The cylindrically projected portion includes inwardly-faced teeth 11a that are formed in an inner circumferential surface thereof. That is, the cylindrically projected portion is formed as an internal gear wheel 11. Further, the internal gear member 10 has a cylindrical portion 12 formed in a central portion thereof. The cylindrical portion 12 is projected in the same direction as the internal gear wheel 11.

The cylindrical portion 12 has an axis that is aligned with an axis 11r of the internal gear member 10 (the internal gear wheel 11). The cylindrical portion 12 has a circular shaft insertion bore 12a that is formed therethrough. An outer disk surface of the internal gear member 10 is joined to a plate surface of a back frame 2f of the seat back 2, so that the internal gear member 10 is integrally affixed to the back frame 2f.

Further, the internal gear member 10 has three oval-shaped dowels 13• • that are respectively formed in a disk-shaped portion thereof so as to be projected from the outer disk surface thereof. (Symbol "• •" means plural number.) The dowels 13• • are formed in positions closer to an outer circumferential periphery of the disk-shaped portion so as to be circumferentially positioned at equal intervals. Conversely, the back frame 2f has dowel insertion holes 2a that are formed therethrough. The dowel insertion holes 2a are shaped such that the dowels 13• • can be fitted thereinto. Therefore, the internal gear member 10 is securely integrally attached to the back frame 2f by fitting the dowels 13• • to the dowel insertion holes 2a formed in the back frame 2f and then welding fitted portions.

In particular, each of the dowels 13• • is shaped to be extended in a circumferential direction. Therefore, each of the dowels 13• • has increased shear strength in the circumferential direction. In addition, the dowels 13• • can be fitted to the back frame 2f in a large area. As a result, the internal gear member 10 can be rigidly integrally attached to the back frame 2f via the dowels 13• •. Further, the back frame 2f has a circular shaft insertion bore 2c that is formed therethrough in a thickness direction. The shaft insertion bore 2c is shaped to have the same diameter as the shaft insertion bore 12a formed in the internal gear member 10. The shaft insertion bores 12a and 2c are shaped such that the rod-like operating shaft 4c can be inserted thereinto, which will be described hereinafter.

Next, a structure of the external gear member 20 will be described. The external gear member 20 is formed as a disk-shaped member having a diameter greater than the diameter of the internal gear member 10. The external gear member 20 is shaped by half die cutting the same in a thickness direction (an axial direction), so that a disk-shaped central portion thereof can be cylindrically projected. The cylindrically projected portion includes outwardly-faced teeth 21a that are formed in an outer circumferential surface thereof. The cylindrically projected portion is formed as an external gear wheel 21. Further, the external gear wheel 21 has a diameter smaller than the diameter of the internal gear wheel 11 formed in the internal gear member 10.

Therefore, when the external gear member 20 thus constructed is axially coupled to the internal gear member 10 while the external gear wheel 21 meshes with the internal gear wheel 11, the external gear member 20 and the internal gear member 10 can be assembled, so as to be rotated relative to each other while meshing with each other. Further, the external gear member 20 has an enlarged opening 22 having a diameter greater than the shaft insertion bore 12a formed in the central portion of the internal gear member 10 described above. The enlarged opening 22 is formed in the central portion of the external gear member 20. The enlarged opening 22 has an axis that is aligned with an axis 21r of the external gear member 20 (the external gear wheel 21).

Figure 5:
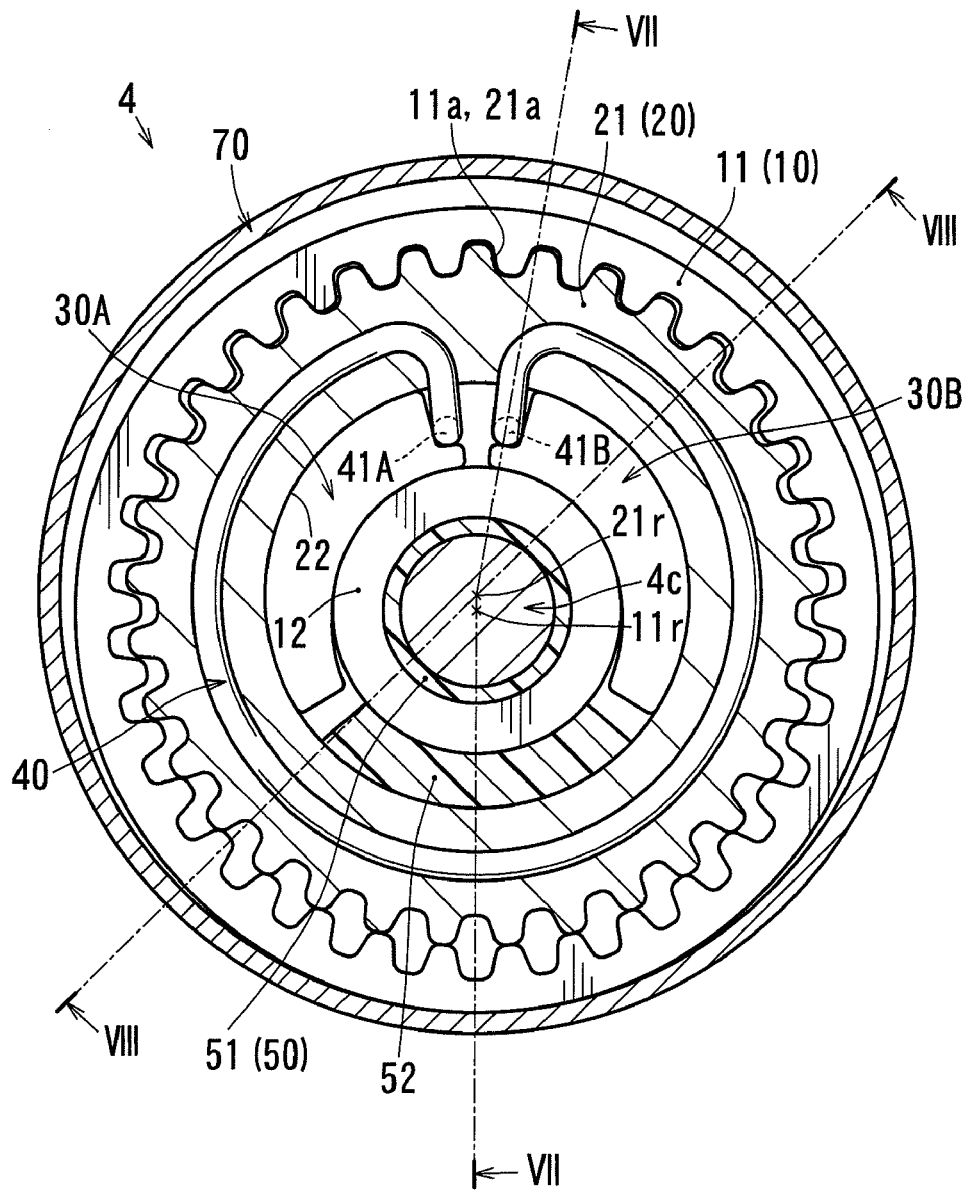
FIG. 5 is a cross-sectional view taken along line V-V in FIG. 4.

Therefore, as shown in FIG. 5, the external gear member 20 is coupled to the internal gear member 10 while the cylindrical portion 12 formed in the internal gear member 10 is positioned within the enlarged opening 22. Further, the external gear member 20 is coupled to the internal gear member 10 while the axes 21r and 11r thereof are offset from each other. Further, the external gear wheel 21 is constructed to have teeth number fewer than the teeth number of the internal gear wheel 11. In particular, the teeth number of the teeth 21a of the external gear wheel 21 is thirty three whereas the teeth number of the teeth 11a of the internal gear wheel 11 is thirty four.

Therefore, when relative revolving motion is performed between the external gear wheel 21 and the toothed inner circumferential surface of the internal gear wheel 11 while a meshing position therebetween is changed, a rotational posture of the external gear member 20 relative to the internal gear member 10 can be gradually changed due to the difference of the teeth number thereof. In particular, as shown in, for example, FIG. 6, when the external gear wheel 21 is relatively revolved clockwise along the toothed inner circumferential surface of the internal gear wheel 11, the external gear member 20 can rotate (spin) counterclockwise relative to the internal gear member 10, so that the rotational posture thereof can be changed However, the internal gear member 10 is connected to the back frame 2f. Conversely, the external gear member 20 is connected to the cushion frame 3f, which will be described hereinafter. Therefore, actually, the internal gear member 10 can rotate relative to the external gear member 20 while changing the meshing position therebetween. As a result, when rotational motion between the external gear wheel 21 and the internal gear wheel 11 is performed described above, as shown in FIG. 3, the tilting angle of the seat back 2 can be adjusted.

With reference to FIG. 1 again, the external gear member 20 has four oval-shaped dowels 23• • that are respectively formed in a disk-shaped portion thereof so as to be projected from an outer disk surface thereof. The dowels 23• • correspond to fitting portions of the present invention. The dowels 23• • are formed in radially outside positions of the external gear wheel 21 and are positioned closer to an outer circumferential periphery of the disk-shaped portion. In particular, the dowels 23• • are formed in locations in which projected portions 20y• • are formed. Further, the projected portions 20y• • are formed circumferentially in locations positioned between radially inwardly depressed portions 20x• • that are formed circumferentially in four locations on an outer circumferential portion of the external gear member 20.

Further, the depressed portions 20x• • and the projected portions 20y• • that are formed in the outer circumferential portion of the external gear member 20 are respectively positioned circumferentially in four locations on the outer circumferential portion of the external gear member 20 at equal intervals, so as to be circumferentially alternated with each other. Further, the dowels 23• • described above are formed in the locations in which projected portions 20y• • are formed. As a result, the dowels 23• • can be positioned circumferentially in four locations at equal intervals.

Further, the cushion frame 3f has dowel insertion holes 3a•• that are formed therethrough. The dowel insertion holes 3a•• are shaped such that the dowels 23•• can be fitted thereto. Therefore, the external gear member 20 is securely integrally attached to the cushion frame 3f by fitting the dowels 23•• to the dowel insertion holes 3a•• formed in the cushion frame 3f and then welding fitted portions.

In particular, each of the dowels 23•• is shaped to be extended in a circumferential direction. Therefore, each of the dowels 23•• has increased shear strength in the circumferential direction. In addition, the dowels 23•• can be fitted to the cushion frame 3f in a large area. As a result, the external gear member 20 can be rigidly attached to the cushion frame 3f via the dowels 23••. Further, the cushion frame 3f has a circular enlarged opening 3c that is formed therethrough in a thickness direction. The enlarged opening 3c is shaped to have the same diameter as the enlarged opening 22 formed in the external gear member 20 described above. The enlarged openings 22 and 3c are shaped such that the rod-like operating shaft 4c can be inserted thereinto, which will be described hereinafter.

Next, structures of the pusher members 30A and 30B will be described. The pusher members 30A and 30B are formed as arcuate piece-shaped members that are symmetrically curved. The pusher members 30A and 30B are assembled while they are received in the enlarged opening 22 formed in the external gear member 20 described above. Thus, as shown in FIG. 5, the pusher members 30A and 30B are disposed in an eccentric space that is formed between an inner circumferential surface of the enlarged opening 22 and an outer circumferential surface of the cylindrical portion 12 of the internal gear member 10 described above.

In particular, the pusher members 30A and 30B are respectively arcuately tapered so as to be oppositely introduced into a narrowing space portion formed between the enlarged opening 22 of the external gear member 20 and the cylindrical portion 12 of the internal gear member 10 (a narrowing space portion positioned in a lower side in FIG. 5). Further, engagement end portions 41A and 41B of the open ring-shaped spring member 40 is attached to the pusher members 30A and 30B while straddling the same. Therefore, the pusher members 30A and 30B are constantly biased by a biasing force of the spring member 40, so as to be maintained in a condition in which tapered lower end portions thereof are oppositely introduced into the above-described narrowing space portion.

Thus, due to a spring force of the spring member 40, the external gear member 20 can normally be maintained in a condition in which it is upwardly biased with respect to the cylindrical portion 12 by the pusher members 30A and 30B, so that the external gear wheel 21 is pressed to the internal gear wheel 11 while meshing with each other without producing clearance (backrush) therebetween. Thus, due to a retention force thus produced, the external gear member 20 can be maintained in a condition (an unrotatable condition) in which the revolving motion previously described is prevented relative to the internal gear member 10.

However, the unrotatable condition due to biasing of the pusher members 30A and 30B can be released by rotating the operating shaft 4c. In particular, as shown in FIG. 1, the cylindrical operating member 50 is axially attached and secured to the operating shaft 4c so as to be integrally rotated therewith. In particular, a serrated portion (not shown) is axially formed in an outer circumferential surface of the operating shaft 4c. When the operating shaft 4c is inserted into a through insertion bore 50a that is formed in a cylindrical portion 51 of the operating member 50, the operating shaft 4c engages a serrated portion (not shown) formed in an inner circumferential surface of an insertion bore 50a. As a result, the operating shaft 4c is secured to the operating member 50 so as to be integrally rotated therewith.

Figure 6:
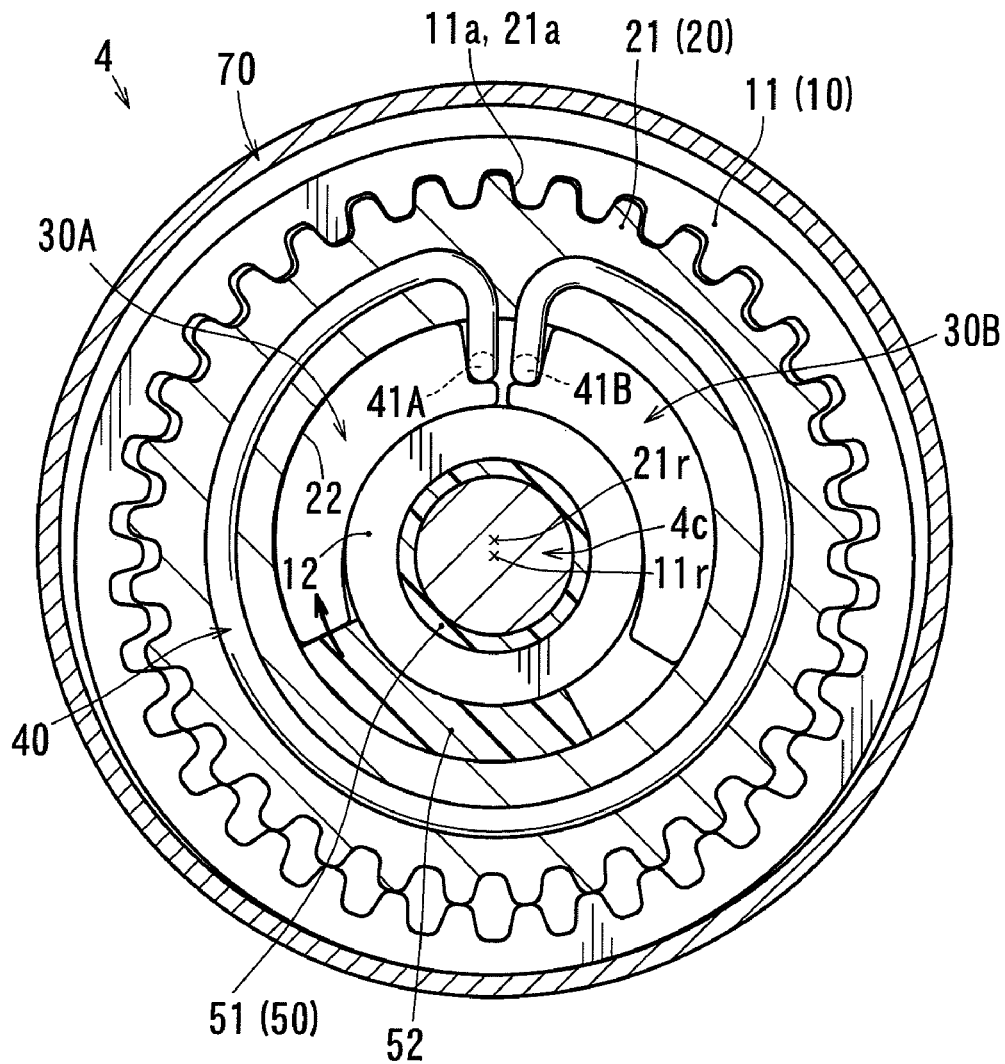
FIG. 6 is a cross-sectional view, which illustrates a condition in which the reclining device is in an operable condition.

The operating member 50 connected to the operating shaft 4c has an arm portion 52 that is axially projected from a lower end portion of a collar portion formed in an end periphery thereof in the same axial direction as the cylindrical portion 51. As shown in FIG. 5, the arm portion 52 is constructed so as to be fitted to the space that is positioned between the lower end portions of the pusher members 30A and 30B. As shown in FIG. 6, when the operating member 50 is rotated, for example, clockwise in the drawings, a bottom surface portion of the left pusher member 30A can be pressed upwardly, so that the left pusher member 30A can be rotated clockwise along the inner circumferential surface of the enlarged opening 22.

Upon rotational movement of the pusher member 30A, the inner circumferential surface of the enlarged opening 22 is pressed, so that the external gear wheel 21 can rotate clockwise along the toothed inner circumferential surface of the internal gear wheel 11 while changing the meshing position therebetween. Depending on this motion, the right pusher member 30B can be rotationally moved clockwise due to the biasing force of the spring member 40 while it is introduced into the space portion that is widened due to the movement described above.

Depending on the movement described above, as previously described with reference to FIG. 3, the seat back 2 can be rotated in a forward or backward tilting direction. Further, as shown in FIG. 5, when rotational operation of the operating shaft 4c is stopped, the pusher members 30A and 30B are placed again in the condition in which they are introduced into the narrowing space portion by the biasing force of the spring member 40, so that the reclining device 4 can be returned to the condition in which it is prevented from rotating.

Next, with reference to FIG. 1 again, the retainer member 70 will be described. The retainer member 70 is formed by stamping a thin steel sheet so as to have a ring shape. Further, the retainer member 70 is cylindrically shaped by axially half die cutting the same and has a flange-shaped support wall 71. The support wall 71 is formed in a right back side end of the retainer member 70 and has an axial surface. Further, an axially extending cylindrical portion of the retainer member 70 is constructed of four axially extending arcuate retainer strips 73•• that are circumferentially plurally formed at intervals, so as to have a discontinuous cylindrical shape as a whole.

The retainer strips 73•• are circumferentially disposed at equal intervals and are constructed to be axially inserted into the depressed portions 20x•• formed in the outer circumferential portion of the external gear member 20. Therefore, the internal gear member 10 is first inserted into the cylindrical portion of the retainer member 70 constructed as described above, so as to be introduced thereinto in a condition in which the outer circumferential portion of the internal gear member 10 is axially held against the support wall 71 described above.

Figure 7:
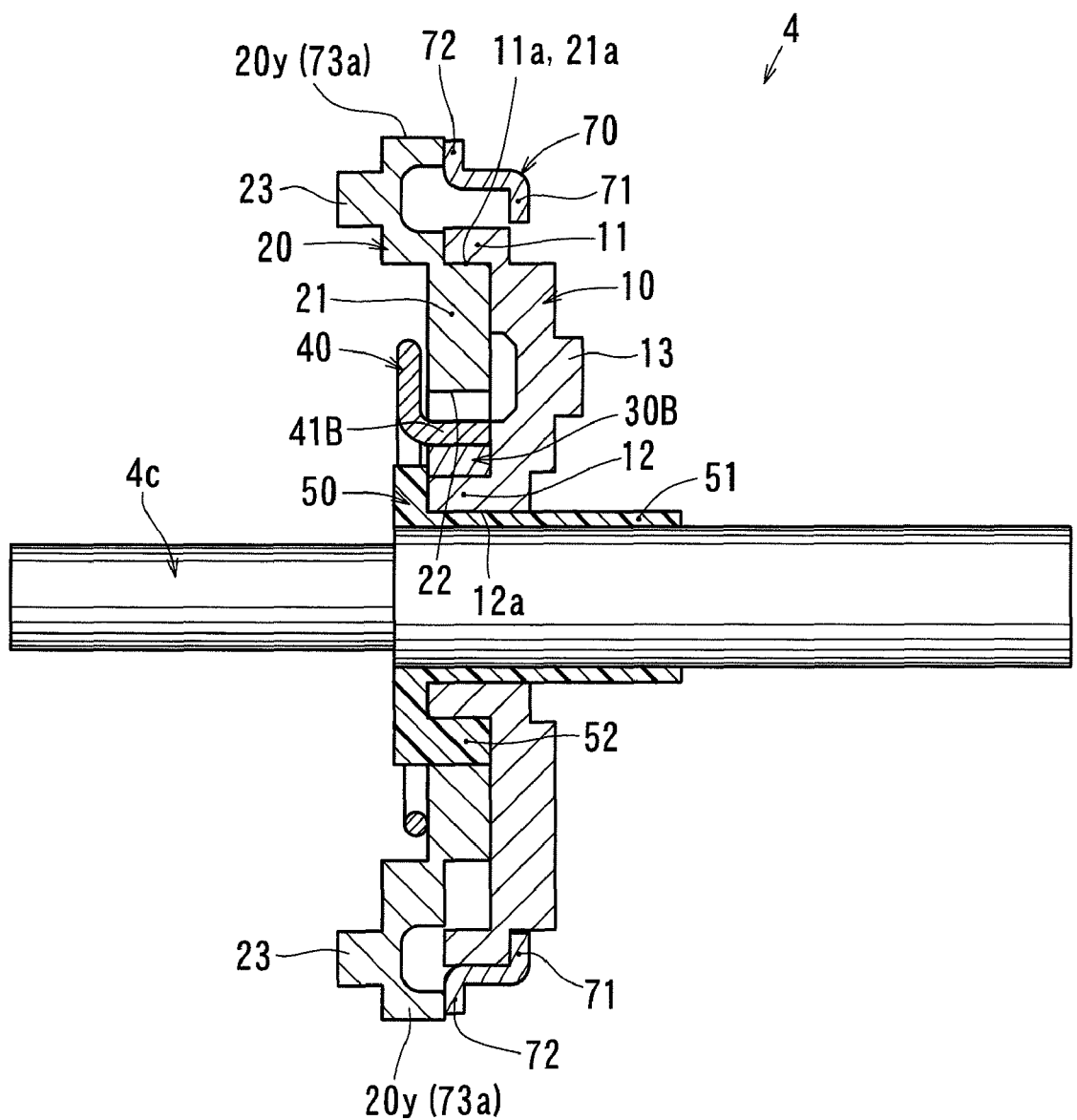
FIG. 7 is a cross-sectional view taken along line VII-VII in FIG. 5.

In a condition in which the internal gear member 10 is assembled, the external gear member 20 is axially inserted into the cylindrical portion of the retainer member 70 while the retainer strips 73•• of the retainer member 70 are axially inserted into the depressed portions 20x•• formed in the outer circumferential portion of the external gear member 20. As a result, the projected portions 20y•• are axially inserted into removed portions 73a•• that are formed between the retainer strips 73•• of the retainer member 70. As shown in FIG. 7, when the projected portions 20y•• is held against engagement surface portions 72• • each having an axial surface, the external gear member 20 is incorporated into the cylindrical portion of the retainer member 70.

Figure 8:
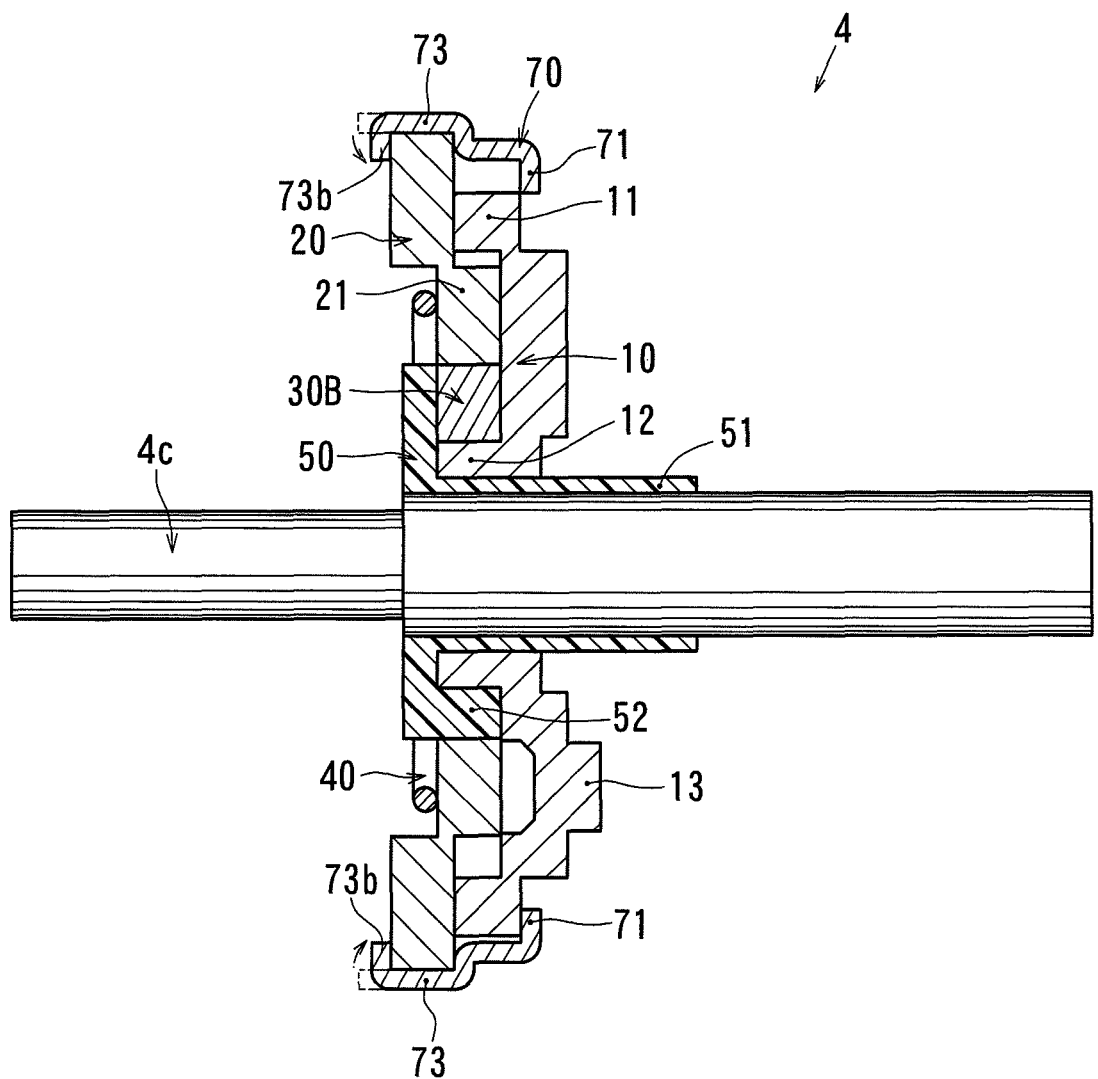
FIG. 8 is a cross-sectional view taken along line VIII-VIII in FIG. 5.

As shown in FIG. 8, in an assembled condition, distal ends of the retainer strips 73• • that are inserted into the depressed portions 20x• • are bent radially inwardly. Thereafter, contact portions 73b• • formed by bending the retainer strips 73• • are crimped against the outer disk surface of the external gear member 20. Thus, the external gear member 20 and the internal gear member 10 are coupled to each other via the retainer member 70, so as to be prevented from being axially separated from each other.

In the reclining device 4 (the connecting device) of the present embodiment, the axially extending retainer strips 73• • of the retainer member 70 are axially inserted into the depressed portions 20x• • formed in the outer circumferential portion of the external gear member 20 and then are bent, so that the bent formed contact surface portions 73b• • thereof can be axially held against the external gear member 20. As a result, the retainer member 70 can prevent the external gear member 20 from being disengaged. Thus, because the retainer member 70 can be attached to the external gear member 20 without radially projecting from the outer circumferential portion of the external gear member 20, the reclining device 4 can be downsized.

Further, because the axially projected dowels 23• • formed in the external gear member 20 are formed circumferentially in the locations positioned between the depressed portions 20x• • (the locations in which the projected portions 20y• • are formed), the dowels 23• • cannot interfere with the above-described contact surface portions 73b• • that are formed in the retainer member 70 by bending. As a result, the dowels 23• • can be positioned closer to the outer circumferential periphery of the external gear member 20. Therefore, even when the reclining device 4 is downsized, a connection strength between the external gear member 20 and the cushion frame 3f (a subject component) can be ensured.

Embodiment 2

Figure 9:
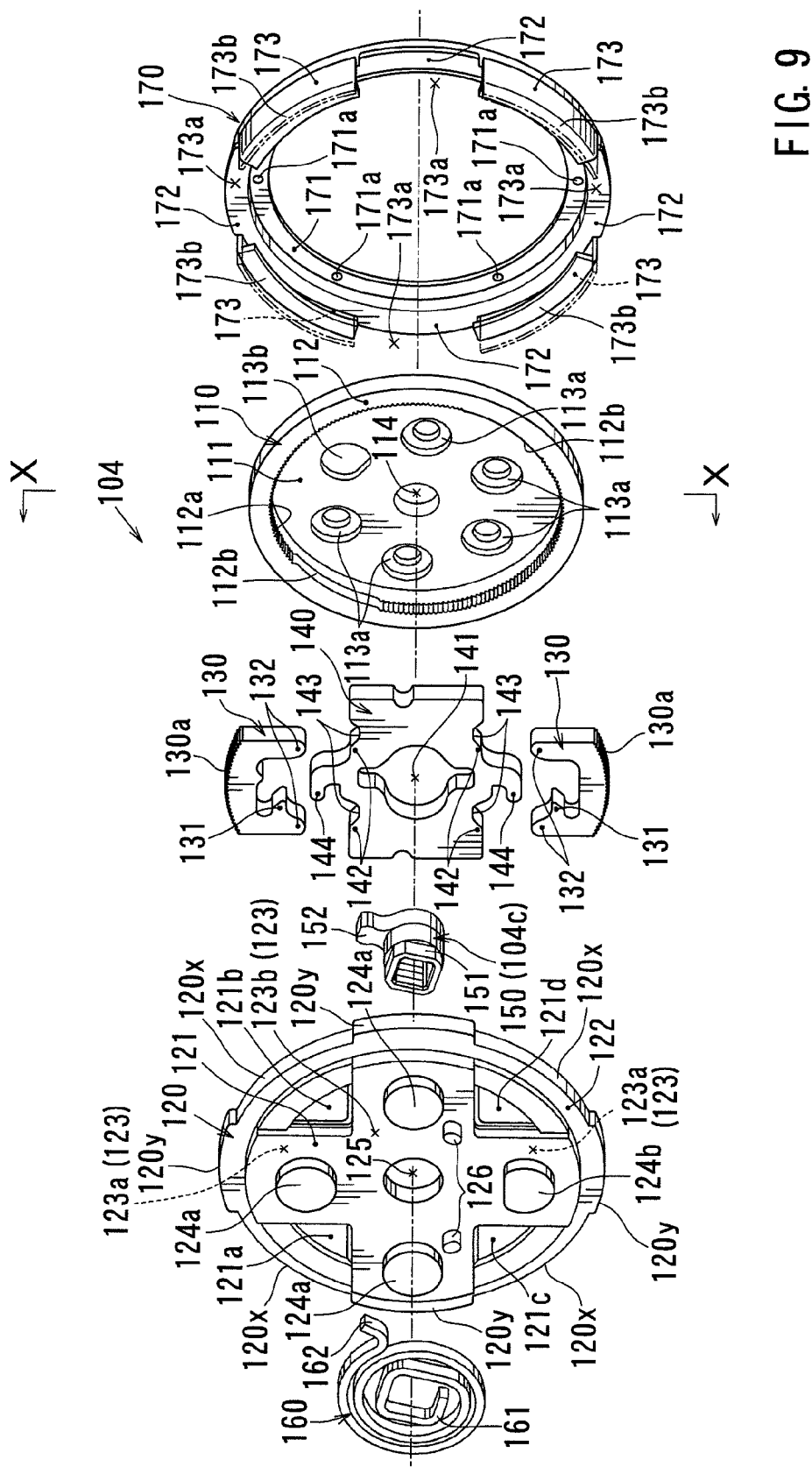
FIG. 9 is an exploded perspective view of a reclining device according to Embodiment 2.

Next, a connecting device (a reclining device 104) of Embodiment 2 will be described with reference to FIGS. 9 to 11. As shown in FIG. 9, the reclining device 104 includes a disk-shaped ratchet 110, a disk-shaped guide 120, a pair of pawls 130 and 130 that are vertically disposed between disk surfaces of the ratchet 110 and the guide 120, a slide cam 140 that is disposed between the disk surfaces of the ratchet 110 and the guide 120, a hinge cam 150 that is capable of sliding the slide cam 140, a biasing spring 160 that is capable of rotatably biasing the hinge cam 150, and a retainer member 170 that is capable of fastening the ratchet 110 and the guide 120 so as to not be prevented from being axially separated from each other, which are assembled as a unit.

Further, the guide 120 corresponds to one of connecting elements of the present invention. Conversely, the ratchet 110 corresponds to the other of the connecting elements of the present invention. As shown in FIG. 9, the above-described ratchet 110 is constructed such that an outer disk surface thereof can be integrally connected to the back frame 2f (FIG. 1) of the seat back 2. Conversely, the guide 120 is constructed such that an outer disk surface thereof can be integrally connected to the cushion frame 3f (FIG. 1) of the seat cushion 3.

In particular, the ratchet 110 has a disk-shaped portion 111 and a cylindrical portion 112. The cylindrical portion 112 is projected from a circumferential periphery of the disk-shaped portion 111 in a thickness direction. The cylindrical portion 112 includes inwardly-faced toothed portions 112a and projected surface portions 112b that are formed in an inner circumferential surface thereof. The projected surface portions 112b are formed as flattened surfaces that are protruded radially inwardly than the inwardly-faced toothed portions 112a. Further, the projected surface portions 112b are axisymmetrically formed in two locations of the inner circumferential surface of the cylindrical portion 112.

Figure 10:
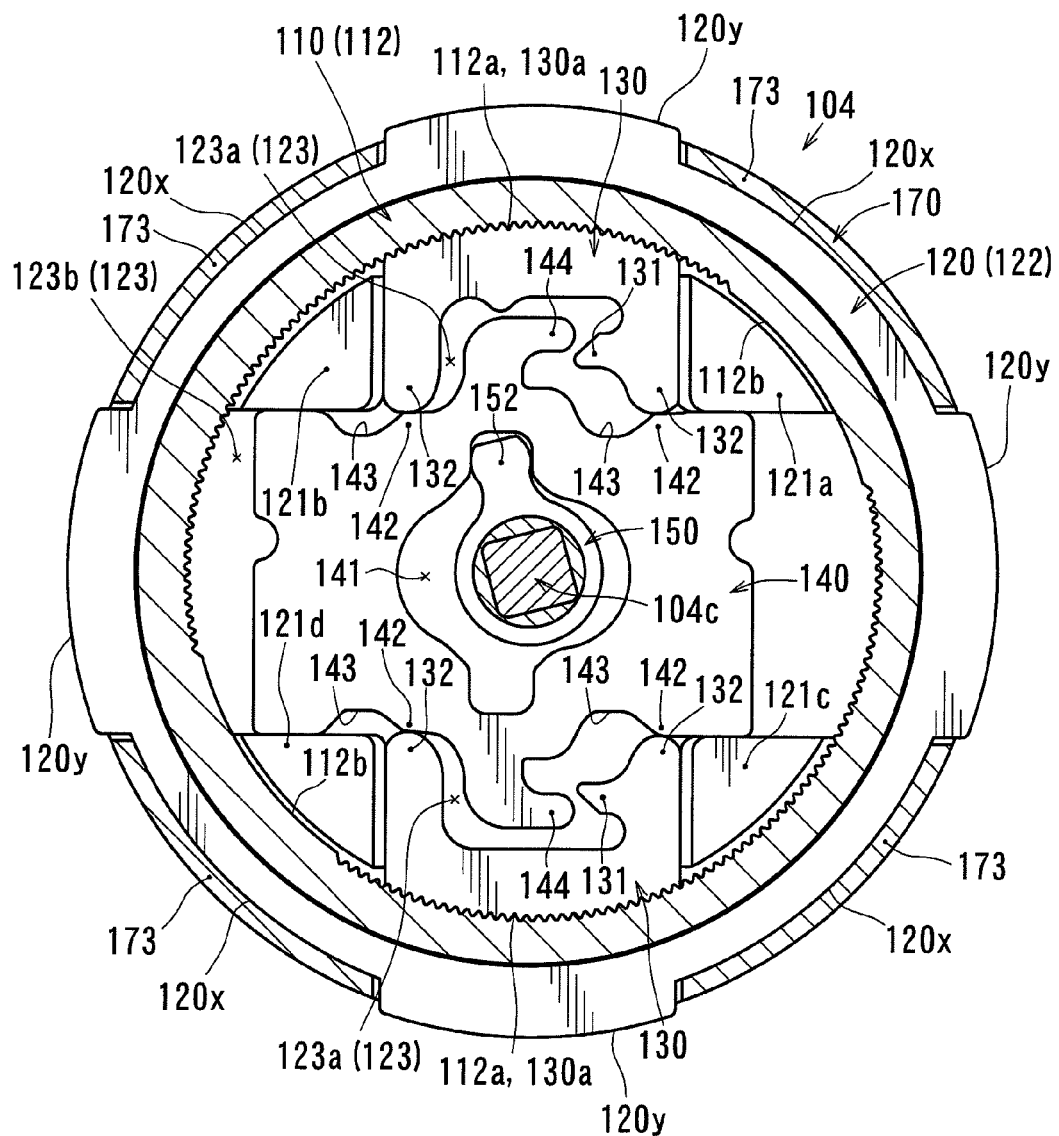
FIG. 10 is a cross-sectional view taken along line X-X in FIG. 9, which illustrates a condition in which the reclining device is locked.
Figure 11:
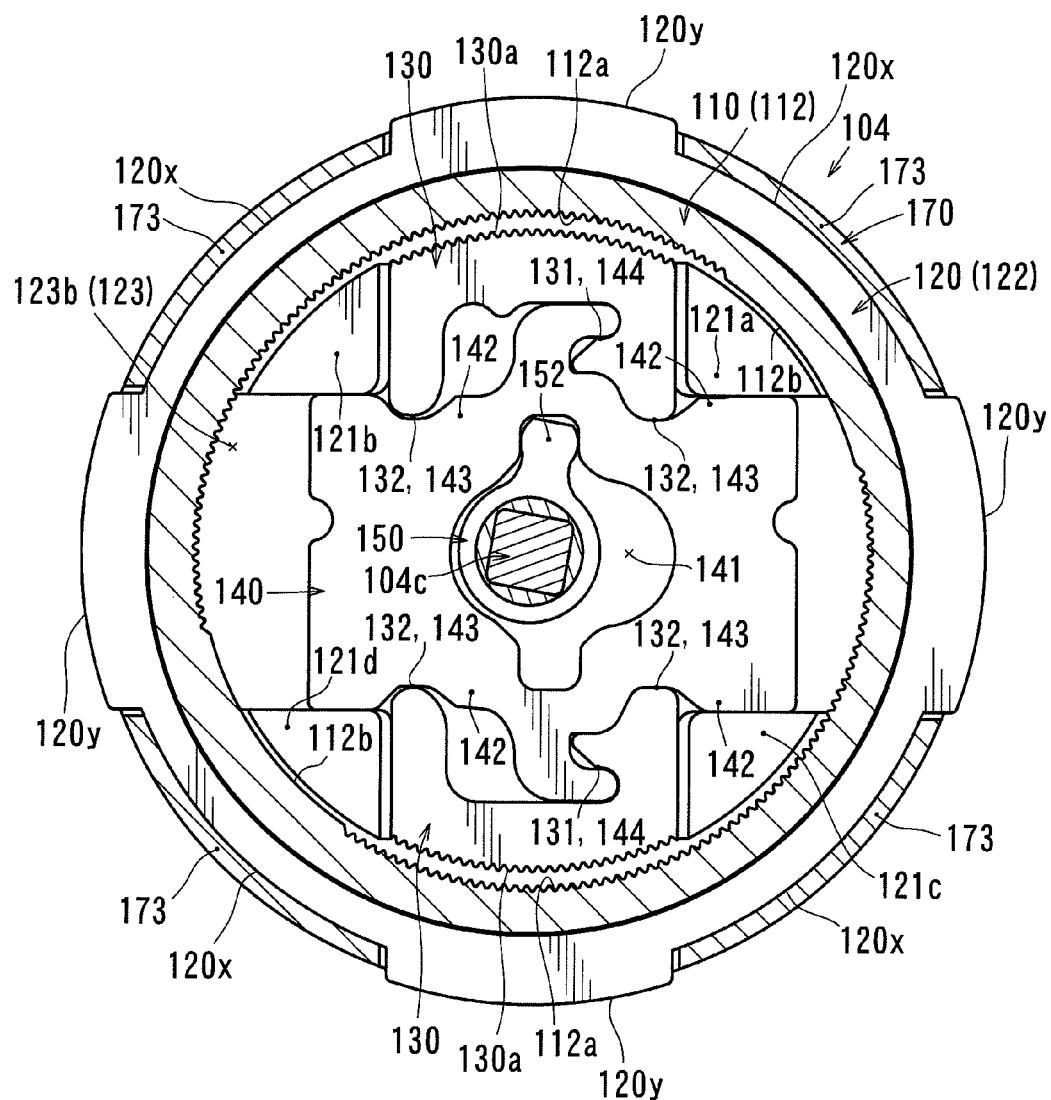
FIG. 11 is a cross-sectional view, which illustrates a condition in which the reclining device is unlocked.

As shown in FIGS. 10 to 11, circumferential angular ranges corresponding to the toothed portions 112a can be defined as an lockable rotational region in which the reclining device 104 can be locked due to engagement of the toothed portions 112a and the pawls 130 and 130, which will be described hereinafter. Conversely, circumferential angular ranges corresponding to the projected surface portions 112b can be defined as a free rotational region in which the reclining device 104 cannot be locked. With reference to FIG. 9 again, the ratchet 110 has a plurality of cylindrical dowels 113a and a D-shaped dowel 113b that are respectively formed in the disk-shaped portion 111 thereof so as to be projected from the outer disk surface thereof.

The dowels 113a• • and the D-shaped dowel 113b are formed as fitting portions that can securely integrally bond the ratchet 110 to the back frame 2f (FIG. 1) described above. The ratchet 110 has a through hole 114 that is formed in a central portion of the disk-shaped portion 111 thereof. The through hole 114 is shaped such that an operating shaft (not shown) for locking and unlocking the reclining device 104 can be inserted therethrough.

Next, with reference to FIG. 9 again, a structure of the guide 120 will be described. The guide 120 is formed as a disk-shaped member having a diameter greater than the diameter of the ratchet 110. The guide 120 has a disk-shaped portion 121 and a cylindrical portion 122. The cylindrical portion 122 is projected from a circumferential periphery of the disk-shaped portion 121 toward the ratchet 110 in a thickness direction. The cylindrical portion 122 is shaped to surround an outer circumferential periphery of the cylindrical portion 112 of the ratchet 110 described above.

In a condition in which the cylindrical portion 112 of the ratchet 110 is incorporated into the cylindrical portion 122, the guide 120 and the ratchet 110 can slidably rotate relative to each other while the cylindrical portions 112 and 122 are fitted to each other. Further, the guide 120 has a plurality of cylindrical dowels 124a• • and a D-shaped dowel 124b that are respectively formed in the disk-shaped portion 121 thereof so as to be projected from the outer disk surface thereof. The dowels 124a• • and the D-shaped dowel 124b are formed as fitting portions (which correspond to the fitting portions of the present invention) that can securely integrally bond the guide 120 to the cushion frame 3f (FIG. 1) described above.

The guide 120 has a through hole 125 that is formed in a central portion of the disk-shaped portion 121 thereof. The through hole 114 is shaped such that the operating shaft (not shown) can be inserted therethrough. The guide 120 has depressed portions 120x• • into which retainer strips 173• • of the retainer member 170 can be axially inserted, and projected portions 120y• • that are capable of being axially inserted into removed portions 173a• • and being held against engagement surface portions 172• •. The depressed portions 120x• • and the projected portions 120y• • are respectively formed in an outer circumferential portion of the guide 120 and are respectively positioned circumferentially in four locations on the outer circumferential portion at equal intervals, so as to be circumferentially alternated with each other.

Further, the guide 120 has a cross-shaped guide groove 123 that is formed in the disk-shaped portion 121 thereof by depressing an inner disk surface thereof in the thickness direction. In the guide groove 123, upper and lower groove portions thereof are respectively formed as pawl grooves 123a and 123a that are capable of receiving the pawls 130 and 130 therein.

As shown in FIG. 10 to 11, the pawl grooves 123a and 123a are defined by guide walls 121a and 121b and guide walls 121c and 121d that can function as right and left walls, and are capable of guiding the pawls 130 and 130 so as to slide the same radially inwardly and outwardly of the guide 120 (upwardly and downwardly in the drawings) only therealong. Further, in the guide groove 123, right and left groove portions thereof and a central groove portion positioned therebetween are formed as a laterally continuous slide cam groove 123b that is capable of receiving the slide cam 140 therein.

The slide cam groove 123b is defined by the guide walls 121a and 121c and the guide walls 121b and 121d that can function as upper and lower walls, and is capable of guiding the slide cam 140 so as to slide the same radially inwardly and outwardly of the guide 120 (rightwardly and leftwardly in the drawings) only therealong. Further, the guide 120 has pin-shaped spring engagement portions 126 and 126 that are respectively formed in the disk-shaped portion 121 thereof so as to be projected from the outer disk surface thereof. The spring engagement portions 126 and 126 are respectively formed as functional elements to which an outer end 162 of the biasing spring 160 (a coil spring) is attached, which will be described hereinbefore. Further, the spring engagement portions 126 and 126 are positioned in circumferentially two locations, so that an attaching position of the outer end 162 of the biasing spring 160 can be changed.

Next, structures of the pawls 130 and 130 will be described. The pawls 130 and 130 are formed as piece-shaped members that are received in the pawl grooves 123a and 123a formed in the guide 120. The pawls 130 and 130 are formed vertically symmetrically with each other. In particular, an outer circumferential periphery of each of the pawls 130 and 130 is shaped to an arcuate shape so as to correspond to the inner circumferential surface of the cylindrical portion 112 of the ratchet 110. Further, the pawls 130 and 130 have outwardly-faced toothed portions 130a and 130a that are formed in an arcuately curved outer circumferential surface thereof and are capable of meshing with the inwardly-faced toothed portions 112a formed in the inner circumferential surface of the cylindrical portion 112 of the ratchet 110.

Therefore, when the pawls 130 and 130 are pressed by the slide cam 140 described hereinafter and are slid radially outwardly, the outwardly-faced toothed portions 130a and 130a can mesh with the inwardly-faced toothed portions 112a formed in the inner circumferential surface of the ratchet 110. As a result, the pawls 130 and 130 and the ratchet 110 can be circumferentially integrated with each other. However, the pawls 130 and 130 can only slide radially inwardly and outwardly with respect to the guide 120.

Therefore, the ratchet 110 can be prevented from relatively rotating with respect to the guide 120 via the pawls 130 and 130 meshing therewith. Thus, the reclining device 104 can be positioned in a locking condition. The locking condition of the reclining device 104 can be released when the pawls 130 and 130 are retracted radially inwardly and are disengaged from the ratchet 110.

The pawls 130 and 130 can be slid radially inwardly and outwardly when the slide cam 140 disposed between the pawls 130 and 130 is moved. The slide cam 140 is formed as a piece-shaped members that is capable being received in the slide cam groove 123b formed in the guide 120 described above. The slide cam 140 is vertically symmetrically shaped.

In particular, the slide cam 140 has shoulder portions 142 and 142 that are capable of pushing the pawls 130 and 130 radially outwardly, and hooks 144 and 144 that are capable of pulling the pawls 130 and 130 radially inwardly. Further, the shoulder portions 142 and 142 and the hooks 144 and 144 are respectively formed in upper and lower peripheries of the slide cam 140.

The pawls 130 and 130 previously described are respectively formed as gate-shaped members in which radially inner sides thereof are partially removed. The pawls 130 and 130 respectively have gatepost-shaped leg portions 132 and 132. The pawls 130 and 130 can be pressed radially outwardly by the slide cam 140 when the leg portions 132 and 132 contact an upper peripheral surface portion and a lower peripheral surface portion of the slide cam 140. In particular, when the slide cam 140 is slid leftwardly in the drawings, the leg portions 132 and 132 can be positioned on the shoulder portions 142 and 142 of the slide cam 140, so that the pawls 130 and 130 can be maintained in a condition in which they are pushed radially outwardly.

Thus, the pawls 130 and 130 are maintained in a condition in which the outwardly-faced toothed portions 130a and 130a mesh with the inwardly-faced toothed portions 112a of the ratchet 110. Further, when the slide cam 140 is slid rightwardly, the hooks 144 and 144 of the slide cam 140 are hooked on engagement portions 131 and 131 formed in gate-shaped inside surfaces of the pawls 130 and 130, so that the pawls 130 and 130 can be pulled radially inwardly. As a result, the leg portions 132 and 132 of the pawls 130 and 130 positioned on the shoulder portions 142 and 142 are introduced into recessed portions 143 and 143 that are positioned left sides thereof, so that the pawls 130 and 130 can be disengaged from the ratchet 110.

The slide cam 140 described above can be slid rightwardly and leftwardly in the drawings when the hinge cam 150 is moved. The hinge cam 150 is disposed in a cam hole 141 that is formed through a central portion of the slide cam 140. The hinge cam 150 is rotatably positioned in the cam hole 141 that is formed through the central portion of the slide cam 140. Further, the hinge cam 150 is constantly rotationally biased counterclockwise in the drawings by a biasing force of the biasing spring 160 (the coil spring) that is attached between the hinge cam 150 and the guide 120. An inner end 161 of the biasing spring 160 is connected to an spring engagement portion 151. Conversely, the outer end 162 of the biasing spring 160 is connected to the spring engagement portion 126 of the guide 120.

Therefore, the hinge cam 150 can normally press the slide cam 140 from an inner surface side of the cam hole 141 by a projection 152 formed in an outer circumferential portion of the hinge cam 150, so as to slide the slide cam 140 leftwardly in the drawings. As a result, the leg portions 132 and 132 can be positioned on the shoulder portions 142 and 142 of the slide cam 140, so that the pawls 130 and 130 can be maintained in a locked condition in which the pawls 130 and 130 engage the ratchet 110.

The hinge cam 150 is integrally connected to the operating shaft (not shown) previously described. Therefore, when the operating shaft is rotated via an operation lever (not shown), the hinge cam 150 can be rotated clockwise against the biasing force of the biasing spring 160 described above. As a result, the slide cam 140 can be slid rightwardly in the drawings, so that the pawls 130 and 130 can be disengaged from the ratchet 110.

Next, with reference to FIG. 9 again, the retainer member 170 will be described. Similar to the retainer member 70 in Embodiment 1, the retainer member 170 is cylindrically shaped and has a flange-shaped support wall 171, four retainer strips 173• • and engagement surface portions 172• •. The support wall 171 is formed in a right back side end of the retainer member 170 and has an axial surface. The retainer strips 173• • are axially extended and are capable of being axially inserted into the depressed portions 120x• • of the guide 120 described above. Further, the engagement surface portions 172• • are capable of axially receiving the projected portions 120y• • of the guide 120.

After the ratchet 110 and the guide 120 are inserted into a cylindrical portion of the retainer member 170, distal ends of the retainer strips 173• • that are inserted into the depressed portions 120x• • are bent. Thereafter, contact surface portions 173b• • formed by bending the retainer strips 173• • are crimped against the outer disk surface of the guide 120. Thus, the guide 120 and the ratchet 110 are coupled to each other via the retainer member 170, so as to be prevented from being axially separated from each other.

Further, the support wall 171 described above has a plurality of projections 171a• • that are formed therein so as to project in a thickness direction (an axial direction) thereof. The projections 171a are circumferentially positioned at equal intervals. Therefore, the support wall 171 can contact the outer disk surface of the ratchet 110 via point contact of the projections 171a• •. As a result, the ratchet 110 can be smoothly rotated.

Thus, the present invention has been described using two embodiments. However, various changes and modifications may be made to the present invention. For example, in the embodiments, the connecting device of the present invention is applied to the reclining device 4 that connects the seat back 2 to the seat cushion 3 (a fixed body) such that the tilting angle of the seat back can be adjusted. However, the connecting device can be applied to a device that is capable of connecting the seat back 2 to a vehicle floor (the fixed body) such that the tilting angle thereof can be adjusted.

Further, the connecting device can be applied to a device that is capable of rotatably connecting the vehicle seat to the vehicle floor. Further, the connecting device can be applied to a device that is capable of tiltably connecting an ottoman supporting leg regions of a sitting person to the seat cushion 3 or the vehicle floor.

In the reclining devices 4 and 104 of the embodiments described above, one of the connecting elements (the external gear member 20 or the guide 120) and the other of the connecting elements (the internal gear member 10 or the ratchet 110) are mutually supportively coupled so as to be rotated relative to each other. However, the connecting elements can be coupled using a supporting member so as to be rotated relative to each other.

In the embodiments, one of the connecting elements (the external gear member 20 or the guide 120) has the depressed portions that are evenly formed circumferentially in four locations on the outer circumferential portion thereof. However, the depressed portions can be unevenly formed. Further, the number of the depressed portions is not limited. In addition, the internal gear member 10 in Embodiment 1 and the ratchet 110 in Embodiment 2 can be constructed as one of connecting elements having the depressed portions that are capable of axially receiving the retainer strips of the retainer member.

The invention claimed is:

1. A connecting device that connects two components to allow rotation between the two components, comprising:
   two connecting elements that respectively integrally connect to the two components and couple to each other so as to be rotatable relative to each other; and
   a retainer member that prevents the two connecting elements from being axially separated from each other,
   wherein the two connecting elements can be switched between a relatively rotatable condition and a relatively unrotatable condition depending on an operational condition of a rotation prevention mechanism disposed between the two connecting elements,
   wherein the retainer member has a plurality of axially extending retainer strips that are capable of axially crossing over and confining outer circumferential portions of the connecting elements, wherein one of the connecting elements has radially inwardly depressed portions that are provided circumferentially in a plurality of locations on the outer circumferential portion of the one of the connecting elements, wherein the retainer member is configured such that when the retainer strips are axially inserted into the depressed portions of the outer circumferential portion of the one of the connecting elements and then distal ends of the inserted retainer strips are radially inwardly bent to form contact surface portions, the contact surface portions are axially pressed against the outer circumferential portion of the one of the connecting elements, wherein the one of the connecting elements has fitting portions that are configured to be fitted to one of the components, and the fitting portions are provided circumferentially in a plurality of locations on the outer circumferential portion of the one of the connecting elements and are positioned between circumferentially adjacent depressed portions, and wherein the fitting portions protrude in an axial direction of the one of the connecting elements.

2. The connecting device as defined in claim 1, wherein the one of the connecting elements has a diameter greater than a diameter of the other of the connecting elements and has an outwardly-faced toothed surface that is capable of meshing with an inwardly-faced toothed surface that is provided on the other of the connecting elements, and wherein the fitting portions provided on the one of the connecting elements are positioned radially outside of the outwardly-faced toothed surface.

3. The connecting device as defined in claim 1, wherein the fitting portions provided in the one of the connecting elements are shaped to be longer in a circumferential direction than in a radial direction.

4. The connecting device as defined in claim 1, wherein the one of the connecting elements has an axially projected external gear wheel having outwardly-faced teeth that are provided on an outer circumferential surface thereof, wherein the other of the connecting elements has an internal gear wheel having inwardly-faced teeth that are provided on an inner circumferential surface thereof and are capable of meshing with the outwardly-faced teeth of the external gear wheel, wherein a pusher member is disposed between the connecting elements, wherein the pusher member presses the external gear wheel to mesh with the internal gear wheel, and wherein upon circumferential rotation of the pusher member, the external gear wheel is rotationally pressed so as to rotate relative to the internal gear wheel while changing a meshing position therebetween.

5. The connecting device as defined in claim 1, wherein the connecting device is a reclining device that connects a seat back of a vehicle seat to a fixed body such that a tilting angle of the seat back can be adjusted.

* * * * *